US010168163B2

(12) United States Patent
Mochizuki et al.

(10) Patent No.: US 10,168,163 B2
(45) Date of Patent: Jan. 1, 2019

(54) NAVIGATION SYSTEM, NAVIGATION METHOD, AND NAVIGATION PROGRAM

(71) Applicant: AISIN AW CO., LTD., Anjo-shi, Aichi-ken (JP)

(72) Inventors: Atsushi Mochizuki, Okazaki (JP); Katsuhiko Mutsuga, Anjo (JP); Kenji Nagase, Okazaki (JP); Daisuke Tanizaki, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 162 days.

(21) Appl. No.: 15/022,020

(22) PCT Filed: Aug. 19, 2014

(86) PCT No.: PCT/JP2014/071619
§ 371 (c)(1),
(2) Date: Mar. 15, 2016

(87) PCT Pub. No.: WO2015/045675
PCT Pub. Date: Apr. 2, 2015

(65) Prior Publication Data

US 2016/0223349 A1 Aug. 4, 2016

(30) Foreign Application Priority Data

Sep. 30, 2013 (JP) ................................ 2013-204929

(51) Int. Cl.
*G01C 21/34* (2006.01)
*G08G 1/0968* (2006.01)
(Continued)

(52) U.S. Cl.
CPC ......... *G01C 21/34* (2013.01); *G01C 21/3415* (2013.01); *G01C 21/3617* (2013.01);
(Continued)

(58) Field of Classification Search
None
See application file for complete search history.

(56) References Cited

U.S. PATENT DOCUMENTS 5,978,732 A 11/1999 Kakitani et al.

FOREIGN PATENT DOCUMENTS

| | | |
|---|---|---|
| JP | H10-9884 A | 1/1998 |
| JP | 2004-340641 A | 12/2004 |
| JP | 2012-242301 A | 12/2012 |

OTHER PUBLICATIONS

Nov. 25, 2014 International Search Report issued in International Patent Application No. PCT/JP2014/071619.

*Primary Examiner* — Rami Khatib
*Assistant Examiner* — Gerrad A Foster
(74) *Attorney, Agent, or Firm* — Oliff PLC

(57) ABSTRACT

Navigation systems, methods, and programs output on an output device information on a set normal travel route when a guidance route for providing guidance to a user is not set. The systems, methods, and programs set a reference route satisfying a predetermined first setting condition as the normal travel route, and when the user travels along a temporary route that shares a start point and an end point with the reference route and is different from the reference route, specify a temporary travel factor that is a factor in which the user travels along the temporary route. The systems, methods, and programs set a second setting condition that varies depending on a content of the specified temporary travel factor, and change the normal travel route from the reference route to the temporary route, based on the second setting condition.

10 Claims, 7 Drawing Sheets

(51) Int. Cl.
*G09B 29/10* (2006.01)
*G01C 21/36* (2006.01)

(52) U.S. Cl.
CPC . *G08G 1/096811* (2013.01); *G08G 1/096844* (2013.01); *G09B 29/106* (2013.01)

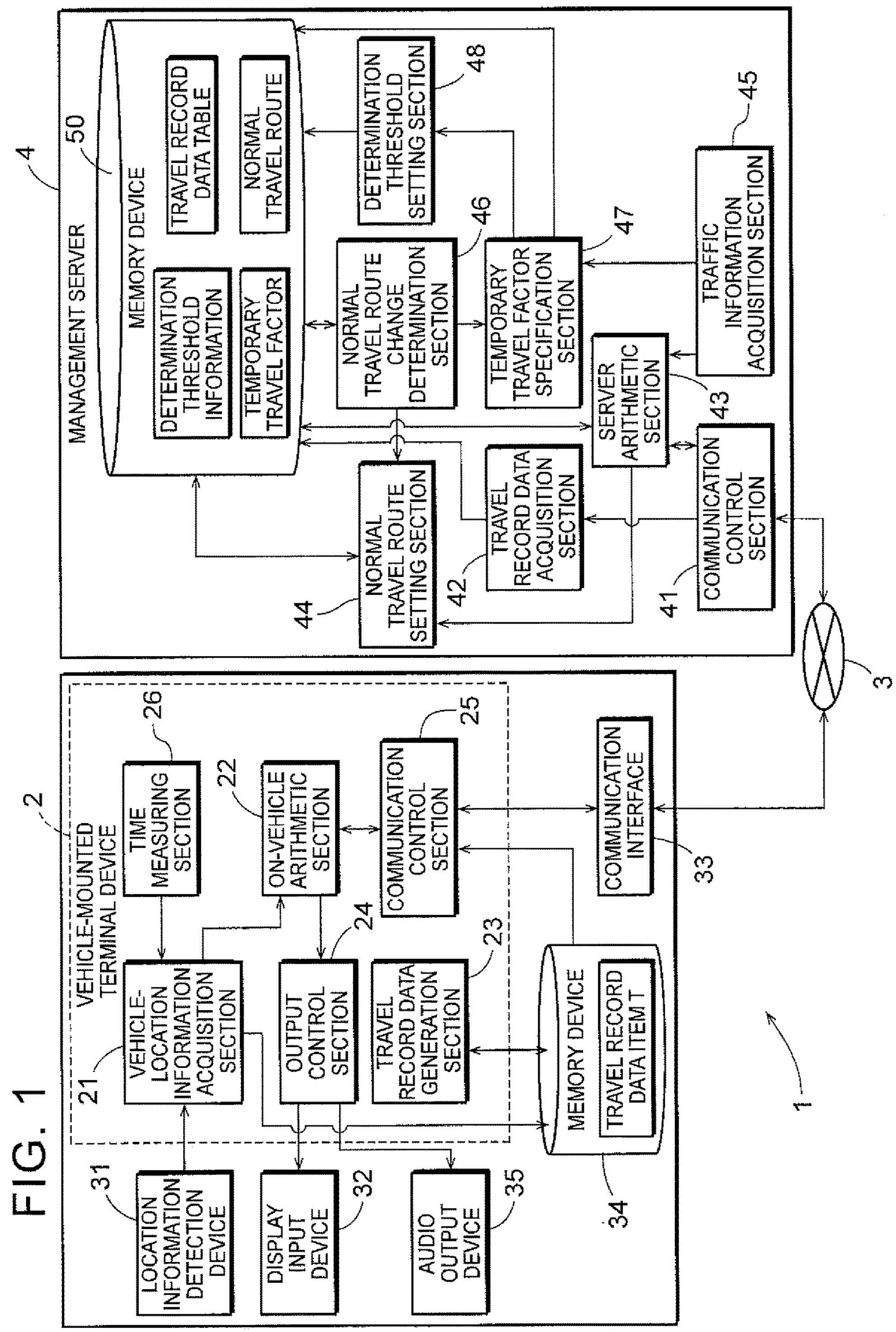
FIG. 1
MANAGEMENT SERVER
4
MEMORY DEVICE
50
TRAVEL RECORD DATA TABLE
NORMAL TRAVEL ROUTE
DETERMINATION THRESHOLD INFORMATION
TEMPORARY TRAVEL FACTOR
DETERMINATION THRESHOLD SETTING SECTION
48
NORMAL TRAVEL ROUTE CHANGE DETERMINATION SECTION
46
TEMPORARY TRAVEL FACTOR SPECIFICATION SECTION
47
TRAFFIC INFORMATION ACQUISITION SECTION
45
SERVER ARITHMETIC SECTION
43
COMMUNICATION CONTROL SECTION
41
TRAVEL RECORD DATA ACQUISITION SECTION
42
NORMAL TRAVEL ROUTE SETTING SECTION
44
3
VEHICLE-MOUNTED TERMINAL DEVICE
2
TIME MEASURING SECTION
26
ON-VEHICLE ARITHMETIC SECTION
22
COMMUNICATION CONTROL SECTION
25
COMMUNICATION INTERFACE
33
VEHICLE-LOCATION INFORMATION ACQUISITION SECTION
21
OUTPUT CONTROL SECTION
24
TRAVEL RECORD DATA GENERATION SECTION
23
MEMORY DEVICE
TRAVEL RECORD DATA ITEM T
34
LOCATION INFORMATION DETECTION DEVICE
31
DISPLAY INPUT DEVICE
32
AUDIO OUTPUT DEVICE
35
1

FIG. 2

TRAVEL RECORD DATA TABLE

| USER ID | DATE | TIME | PASSING LINK | |
|---|---|---|---|---|
| USER P | 2013/8/5 | AM8:31 | Link001 | T; ROUTE A |
| | 2013/8/5 | AM8:42 | Link002 | |
| | 2013/8/5 | AM8:46 | Link012 | |
| | 2013/8/5 | AM8:50 | Link013 | |
| | 2013/8/5 | AM8:57 | Link024 | |
| | ⋮ | ⋮ | ⋮ | |
| | 2013/9/3 | AM8:32 | Link001 | ROUTE A |
| | 2013/9/3 | AM8:40 | Link002 | |
| | 2013/9/3 | AM8:45 | Link012 | |
| | 2013/9/3 | AM8:52 | Link013 | |
| | 2013/9/3 | AM8:55 | Link024 | |
| | 2013/9/4 | AM8:30 | Link001 | ROUTE A |
| | 2013/9/4 | AM8:42 | Link002 | |
| | 2013/9/4 | AM8:45 | Link012 | |
| | 2013/9/4 | AM8:50 | Link013 | |
| | 2013/9/4 | AM8:56 | Link024 | |
| | 2013/9/5 | AM8:31 | Link001 | ROUTE A |
| | 2013/9/5 | AM8:42 | Link002 | |
| | 2013/9/5 | AM8:46 | Link012 | |
| | 2013/9/5 | AM8:50 | Link013 | |
| | 2013/9/5 | AM8:57 | Link024 | |
| | 2013/9/6 | AM8:30 | Link001 | ROUTE B |
| | 2013/9/6 | AM8:42 | Link051 | |
| | 2013/9/6 | AM8:45 | Link052 | |
| | 2013/9/6 | AM8:50 | Link055 | |
| | 2013/9/6 | AM8:56 | Link024 | |
| | ⋮ | ⋮ | ⋮ | |
| USER Q | 2013/9/1 | AM8:15 | Link038 | |
| | 2013/9/1 | AM8:20 | Link039 | |
| | 2013/9/1 | AM8:35 | Link042 | |
| | 2013/9/1 | AM8:45 | Link043 | |
| | 2013/9/3 | AM8:05 | Link038 | |
| | 2013/9/3 | AM8:12 | Link039 | |
| | 2013/9/3 | AM8:28 | Link042 | |
| | 2013/9/3 | AM8:40 | Link043 | |
| | ⋮ | ⋮ | ⋮ | |
| ⋮ | ⋮ | ⋮ | ⋮ | |

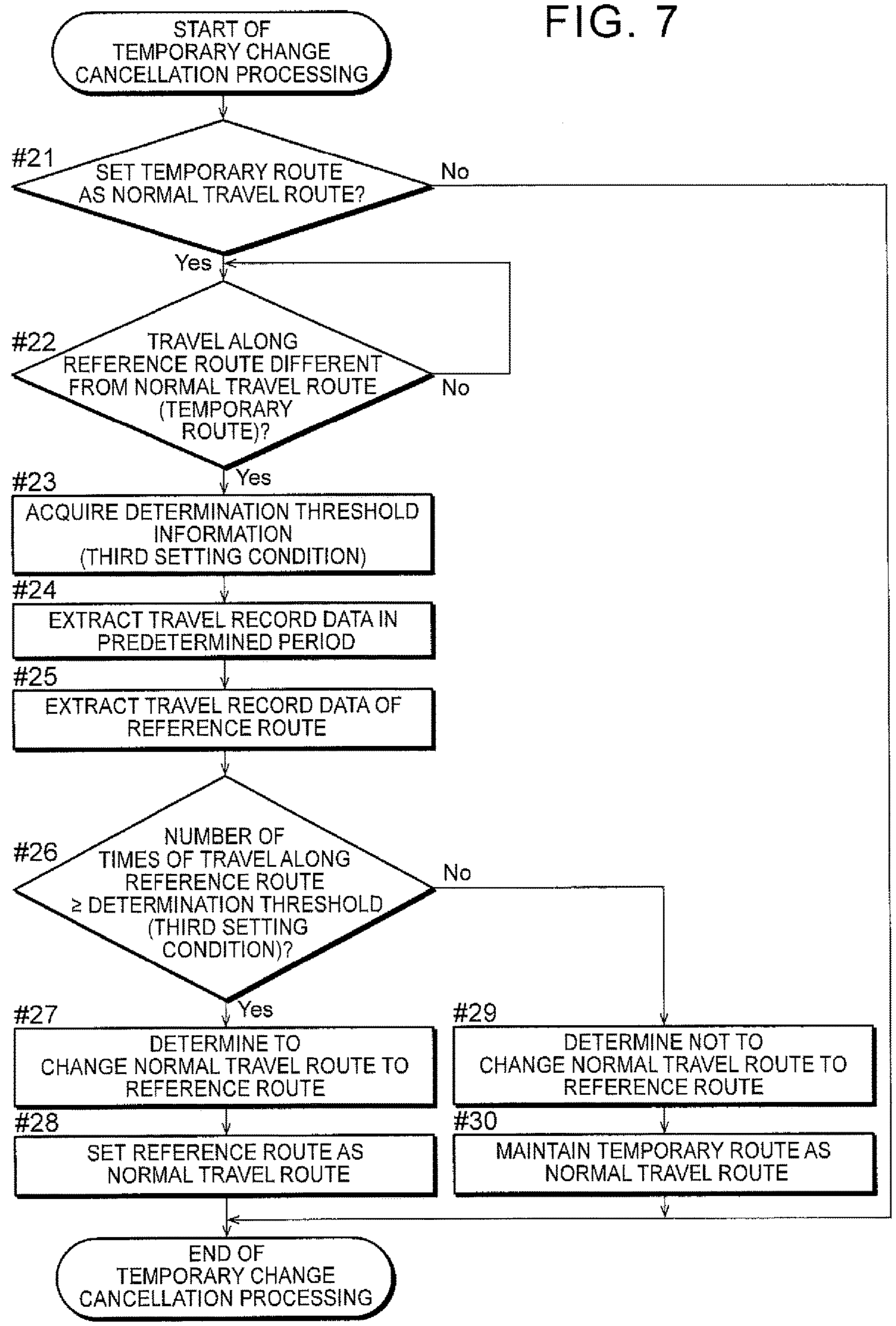
FIG. 7
START OF TEMPORARY CHANGE CANCELLATION PROCESSING
21
SET TEMPORARY ROUTE AS NORMAL TRAVEL ROUTE?
No
Yes
22
TRAVEL ALONG REFERENCE ROUTE DIFFERENT FROM NORMAL TRAVEL ROUTE (TEMPORARY ROUTE)?
No
Yes
23
ACQUIRE DETERMINATION THRESHOLD INFORMATION (THIRD SETTING CONDITION)
24
EXTRACT TRAVEL RECORD DATA IN PREDETERMINED PERIOD
25
EXTRACT TRAVEL RECORD DATA OF REFERENCE ROUTE
26
NUMBER OF TIMES OF TRAVEL ALONG REFERENCE ROUTE ≥ DETERMINATION THRESHOLD (THIRD SETTING CONDITION)?
No
Yes
27
DETERMINE TO CHANGE NORMAL TRAVEL ROUTE TO REFERENCE ROUTE
28
SET REFERENCE ROUTE AS NORMAL TRAVEL ROUTE
29
DETERMINE NOT TO CHANGE NORMAL TRAVEL ROUTE TO REFERENCE ROUTE
30
MAINTAIN TEMPORARY ROUTE AS NORMAL TRAVEL ROUTE
END OF TEMPORARY CHANGE CANCELLATION PROCESSING

NAVIGATION SYSTEM, NAVIGATION METHOD, AND NAVIGATION PROGRAM

TECHNICAL FIELD

Related technical fields include navigation systems for providing information on a predetermined normal travel route in a case where a guidance route for providing guidance to a user is not set.

BACKGROUND ART

A technique of a recent navigation system is known to provide a detour for avoiding traffic congestion when acquiring information of traffic congestion, etc. on a road on which the vehicle is traveling. In Patent Document 1 described below, for example, the technique is described in which, when a navigation system acquires information indicating that traffic congestion TG has occurred on a reference route (initial guidance route RU1), which is a route obtained by searching from a departure point to a destination, the navigation system presents a temporary route (detour DR) for avoiding the traffic congestion TG. Then, in a case where the vehicle travels along the temporary route and the same destination is set later, a route including the temporary route is employed as a normal travel route (basic route) and is preferentially presented for guidance.

In this manner, in Japanese Patent Application Publication No. 2004-340641 (JP 2004-340641), in a case where a vehicle travels along a temporary route because of occurrence of traffic congestion on a reference route, the temporary route is employed as a normal travel route thereafter.

SUMMARY

There are various events that cause detour from a reference route other than traffic congestion. Depending on factors of detour, it is not necessarily appropriate to set the temporary route (detour DR) as the normal travel route. Also, in a case where no guidance route is set, it can be more convenient in some cases for a user to receive traffic information, etc. on a route repeatedly traveled by the user. However, JP 2004-340641 does not describe a technique for providing information on a normal travel route to a user in a case where no guidance route is set.

In view of this, it is desirable to achieve a navigation system that can appropriately set a normal travel route and provide a user with information on the normal travel route even in a case where no guidance route is set.

In view of the above, a characteristic configuration of a navigation system includes a computation processing portion configured to perform: information provision processing of providing information on a set normal travel route by using an information output device in a case where a guidance route for providing guidance to a user is not set; normal travel route setting processing of setting a reference route satisfying a predetermined first setting condition as the normal travel route; factor specification processing of, in a case where the user travels along a temporary route that shares a start point and an end point with the reference route and is different from the reference route, specifying a temporary travel factor that is a factor in which the user travels along the temporary route; condition setting processing of setting a second setting condition that varies depending on a content of the temporary travel factor specified by the factor specification processing; and temporary change processing of changing the normal travel route from the reference route to the temporary route, based on the second setting condition set by the condition setting processing.

With this configuration, in a case where the user travels along the temporary route different from the reference route, an appropriate second setting condition can be set depending on the content of the temporary travel factor that is a factor in which the user travels along the temporary route. The temporary travel factor herein includes various factors including travel regulations such as road closure and lane restriction, and traffic disturbance such as traffic congestion. In a case where the user is less likely to travel along the reference route because of the travel regulations lasting for a relatively long period, for example, it is preferable to promptly set the temporary route as the normal travel route. On the other hand, in a case where the user is likely to travel along the temporary route temporarily because of temporary traffic congestion, for example, it is not preferable to promptly set the temporary route as the normal travel route. Based on the second setting condition that has been set depending on the content of these temporary travel factors, the temporary change processing of setting the temporary route as the normal travel route is performed, so that the normal travel route matching the user's intension can be set. In addition, by providing information on the normal travel route thus set, information useful for the user can be provided even when a guidance route is not set.

A technical feature of a navigation system according to embodiments of the inventive principles described herein is also applicable to a navigation method and storage mediums, such as DVD-ROMs and flash memories, storing a navigation program. (As used herein the term "storage medium" is not intended to encompass transitory signals).

In this case, a characteristic configuration of a navigation method is to cause a computation processing portion to perform: an information provision step of providing information on a set normal travel route by using an information output device in a case where a guidance route for providing guidance to a user is not set; a normal travel route setting step of setting a reference route satisfying a predetermined first setting condition as the normal travel route; a factor specification step of, in a case where the user travels along a temporary route that shares a start point and an end point with the reference route and is different from the reference route, specifying a temporary travel factor that is a factor in which the user travels along the temporary route; a condition setting step of setting a second setting condition that varies depending on a content of the temporary travel factor specified by the factor specification step; and a temporary change step of changing the normal travel route from the reference route to the temporary route, based on the second setting condition set by the condition setting step.

In this case, a characteristic configuration of a navigation program is to cause a computer to perform: an information provision function of providing information on a set normal travel route by using an information output device in a case where a guidance route for providing guidance to a user is not set; a normal travel route setting function of setting a reference route satisfying a predetermined first setting condition as the normal travel route; a factor specification function of, in a case where the user travels along a temporary route that shares a start point and an end point with the reference route and is different from the reference route, specifying a temporary travel factor that is a factor in which the user travels along the temporary route; a condition setting function of setting a second setting condition that varies depending on a content of the temporary travel factor specified by the factor specification function; and a temporary change function of changing the normal travel route from the reference route to the temporary route, based on the second setting condition set by the condition setting function.

BRIEF DESCRIPTION OF THE DRAWINGS

FIG. 1 is a block diagram schematically illustrating a configuration of a vehicle-mounted terminal device and a management server.

FIG. 2 shows an example of a travel record database.

FIG. 7 is a flowchart showing a procedure for temporary change cancellation processing.

DETAILED DESCRIPTION OF EXEMPLARY EMBODIMENTS

1. Configuration of Navigation System

Figure 3:
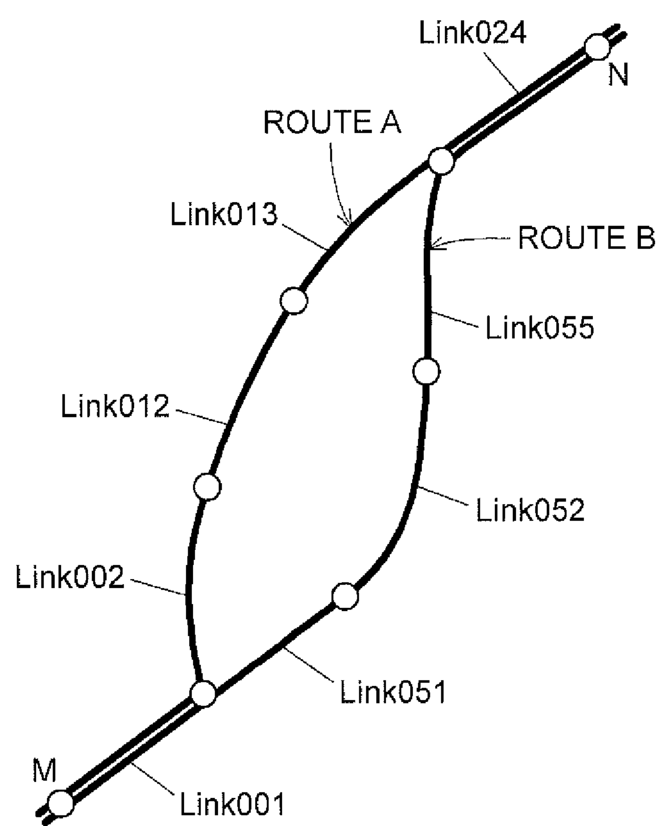
FIG. 3 shows an example of a reference route and a temporary route.

An embodiment be described with reference to the drawings. As illustrated in FIG. 1, a navigation system 1 according to the present embodiment includes vehicle-mounted terminal devices 2, such as navigation devices each mounted on a vehicle, and a management server 4 configured to be capable of communicating with the vehicle-mounted terminal devices 2. In the navigation system 1, the vehicle-mounted terminal devices 2 are connected to a communication network 3 such as the Internet through a wireless base station (not shown). The wireless communication between the vehicle-mounted terminal devices 2 and the wireless base station can be performed by using a cellular phone network or a wireless local area network (LAN), for example. The management server 4 is also connected to the communication network 3. A navigation program of the navigation system 1 is stored in a memory device 34 of each of the vehicle-mounted terminal devices 2 or a memory device 50 of the management server 4. The navigation program is stored in a storage medium such as a DVD-ROM or a flash memory to be distributed or is delivered from a network server to the vehicle-mounted terminal devices 2 or the management server 4 through the communication network 3. The distributed or delivered navigation program is stored in the memory device 34 of each of the vehicle-mounted terminal devices 2 or the memory device 50 of the management server 4.

In the present embodiment, each of the vehicle-mounted terminal devices 2 generates travel record data items T including a record of roads traveled by a vehicle and a record of times when the vehicle traveled the roads, and transmits the travel record data items T as a type of probe information to the management server 4. The management server 4 sets, for each user that uses the vehicle-mounted terminal device 2 (hereinafter simply referred to as a user), a normal travel route, which is a route frequently traveled by the user, by using information on the travel record data items T included in each of the vehicle-mounted terminal devices 2, which have been collected from the vehicle-mounted terminal devices 2. The user according to the present embodiment refers to a target to which guidance is provided by the navigation system 1 and includes a user riding a bicycle or a user who walks, as well as a user on a vehicle. In a case where a guidance route for providing guidance to the user is not set, the management server 4 provides information on the normal travel route set for the user to the vehicle-mounted terminal device 2. A vehicle-location information acquisition section 21, an on-vehicle arithmetic section 22, a travel record data generation section 23, an output control section 24, a communication control section 25, and a time measuring section 26 of each of the vehicle-mounted terminal devices 2 and a communication control section 41, a travel record data acquisition section 42, a server arithmetic section 43, a normal travel route setting section 44, a traffic information acquisition section 45, a normal travel route change determination section 46, a temporary travel factor specification section 47, and a determination threshold setting section 48 of the management server 4 correspond to a “computation processing portion.”. For easy description, a configuration of the vehicle-mounted terminal device 2 of a user F and a configuration of the management server 4 will be hereinafter described with reference to FIG. 1.

2. Configuration of Vehicle-mounted Terminal Device

As illustrated in FIG. 1, the vehicle-mounted terminal device 2 includes the vehicle-location information acquisition section 21, the on-vehicle arithmetic section 22, the travel record data generation section 23, the output control section 24, the communication control section 25, and the time measuring section 26. Each of these functional sections is constituted by one or both of hardware and software (program) to perform various types of processing on input data. The vehicle-mounted terminal device 2 is connected to a location information detection device 31, a display input device 32, an audio output device 35, and a communication interface 33. These are configured to exchange information to each other. The vehicle-mounted terminal device 2 has a hardware configuration similar to that of a general-purpose computer such as a computation processing portion, e.g., a central processing unit (CPU), a memory device 34, e.g., a hard disk or an optical disk, or a temporary memory device, e.g., a random access memory (RAM).

The vehicle-location information acquisition section 21 is a functional section for acquiring vehicle-location information indicating a current location of a vehicle on which the vehicle-mounted terminal device 2 is mounted. In the present embodiment, the vehicle-location information acquisition section 21 acquires vehicle-location information from the location information detection device 31 regularly (e.g., every one second), and stores the acquired information in the memory device 34. The vehicle-location information acquisition section 21 acquires information on the date and time when the vehicle-location information was acquired from the time measuring section 26 that measures the current date and time, and stores the acquired information in the memory device 34. The vehicle-location information acquisition section 21 also outputs the acquired vehicle-location information to the on-vehicle arithmetic section 22.

The location information detection device 31 has a function of detecting a current location, a speed, and acceleration of the vehicle-mounted terminal device 2. Specifically, the location information detection device 31 includes various devices for detecting location information, such as a global positioning system (GPS) receiver, a distance sensor (speed sensor), an acceleration sensor, a direction sensor, and a receiver for receiving radio waves or light including point location information transmitted from beacons disposed along roads. The location information detection device 31 outputs the detected vehicle-location information to the vehicle-location information acquisition section 21.

The on-vehicle arithmetic section 22 is a functional section that performs various types of navigation processing. In the present embodiment, the server arithmetic section 43 (described later), which is an arithmetic section included in the management server 4, performs a main part of the navigation processing such as a route search from a departure point to a destination of the vehicle-mounted terminal device 2 and determination of information to be provided. Thus, the on-vehicle arithmetic section 22, which is an arithmetic section included in the vehicle-mounted terminal devices 2, performs auxiliary navigation processing such as an output of guidance information. The on-vehicle arithmetic section 22 generates various images necessary for the navigation processing, such as a map image and a destination input display to display the images on a display screen (not shown) of the display input device 32 through the output control section 24, or generates voice guidance data necessary for, for example, route guidance to perform processing of outputting the voice guidance, for example, through the audio output device 35. The output control section 24 is a functional section that performs control for drawing a display image on a display screen of the display input device 32 and controls the audio output device 35. The display input device 32 is a device in which a display device such as a liquid crystal display and an input device such as a touch panel are integrated. The audio output device 35 may be constituted by, for example, a speaker. The display input device 32 and the audio output device 35 of the present embodiment correspond to an "information output device."

When the on-vehicle arithmetic section 22 acquires vehicle-location information from the vehicle-location information acquisition section 21, a location of a vehicle on which the vehicle-mounted terminal device 2 is mounted is displayed to be superimposed on a map displayed on the display screen of the display input device 32. When a destination is input through the display input device 32, the on-vehicle arithmetic section 22 acquires vehicle-location information at a point of time when the destination was input, from the vehicle-location information acquisition section 21, and transmits the vehicle-location information to the management server 4 together with the input destination information. When the on-vehicle arithmetic section 22 acquires route guidance information to the destination obtained by searching in the management server 4, the on-vehicle arithmetic section 22 displays the route guidance information on the display screen of the display input device 32 through the output control section 24, and also outputs the voice guidance from the audio output device 35.

In a case where no guidance route is set, the on-vehicle arithmetic section 22 transmits a request of information provided on non-guidance, which is a request to obtain information provided on non-guidance, to the management server 4. The information provided on non-guidance herein specifically refers to information on a normal travel route set for each user in the management server 4, and includes various traffic information items (e.g., traffic congestion information and travel regulation information) on a road (link) constituting the normal travel route. The normal travel route will be specifically described later. In the present embodiment, in a case where no guidance route is set although the location information detection device 31, for example, detects start of traveling of a vehicle (i.e., start of movement of the user), the on-vehicle arithmetic section 22 transmits the request of information provided on non-guidance to the management server 4. Then, when the on-vehicle arithmetic section 22 acquires information provided on non-guidance transmitted from the management server 4 in response to the request of information provided on non-guidance, the on-vehicle arithmetic section 22 causes the information provided on non-guidance to be displayed on the display screen of the display input device 32 through the output control section 24, or alternatively, outputs the voice guidance through the audio output device 35, thereby providing guidance to the user. On the other hand, in a case where a guidance route is set, or in a case where information provided on non-guidance has been already acquired, the on-vehicle arithmetic section 22 stops transmitting the request of information provided on non-guidance to the management server 4, and performs normal route guidance.

The travel record data generation section 23 is a functional section that generates a travel record data item T including a record of roads traveled by a user and a record of times when the user traveled the roads. In the present embodiment, based on the vehicle-location information and the time information associated with the vehicle-location information stored in the memory device 34, the travel record data generation section 23 associates information on a link traveled by the user with information on a time when the user entered the link, and generates a travel record data item T as necessary (see FIG. 2). Then, the travel record data generation section 23 stores the generated travel record data item T in the memory device 34 as necessary.

The communication control section 25 is a functional section that controls transmission and reception of information to and from the management server 4. The communication control section 25 performs processing of transmitting the travel record data item T stored in the memory device 34 to the management server 4 at a predetermined timing. For example, the communication control section 25 transmits the travel record data item T stored as necessary to the management server 4 as necessary or at regular intervals through the communication interface 33. When detecting that an ignition key is turned OFF, the communication control section 25 may transmit a travel record data item T generated for a period of time until the ignition key is turned OFF (per trip from when the ignition key is turned ON to when the ignition key is turned OFF), to the management server 4. The communication interface 33 may be a dedicated communication module or a general-purpose communication device such as a cellular phone. Each of the vehicle-mounted terminal devices 2 is provided with identification information (a user ID in the present embodiment) for identifying individual users (vehicle-mounted terminal devices 2). When each of the vehicle-mounted terminal devices 2 (the communication control sections 25) transmits a travel record data item T or a request of information provided on non-guidance, for example, to the management server 4, information on a user ID is also transmitted.

3. Configuration of Management Server

As illustrated in FIG. 1, the management server 4 includes the communication control section 41, the travel record data acquisition section 42, the server arithmetic section 43, the normal travel route setting section 44, the traffic information acquisition section 45, the normal travel route change determination section 46, the temporary travel factor specification section 47, and the determination threshold setting section 48. Each of these sections is constituted by one or both of hardware and software (program) to perform various types of processing on input data. The management server 4 has a hardware configuration similar to that of a general-purpose computer such as a computation processing portion, e.g., a CPU, a memory device 50, e.g., a hard disk or an optical disk, or a temporary memory device, e.g., a RAM.

The communication control section 41 is a functional section that controls transmission and reception of information to and from the vehicle-mounted terminal devices 2. The communication control section 41 transmits information to each of the vehicle-mounted terminal devices 2 based on a user ID of the vehicle-mounted terminal device 2. The management server 4 transmits and receives information to and from the vehicle-mounted terminal device 2 through an unillustrated communication interface.

The travel record data acquisition section 42 is a functional section that acquires a travel record data items T from the vehicle-mounted terminal device 2. In the present embodiment, the travel record data acquisition section 42 stores the travel record data items T acquired from the vehicle-mounted terminal devices 2 (the communication control sections 25) in a travel record data table of the memory device 50 based on the user IDs associated with the travel record data items T for the individual users. FIG. 2 shows an example of the travel record data table. As shown in FIG. 2, in the travel record data table, the travel record data items T are arranged in the ascending order of the passing times of the links included in the travel record data items T. In the example of FIG. 2, only travel record data items T acquired in a predetermined time zone (from 8 am to 9 am in the present embodiment) in a predetermined period (within the most recent one month) are extracted.

The server arithmetic section 43 is a functional section that performs a main part of the navigation processing including a route search from a departure point to a destination of the vehicle-mounted terminal device 2 and determination of information to be provided. In the present embodiment, when the server arithmetic section 43 acquires destination information and vehicle-location information from the vehicle-mounted terminal device 2, the server arithmetic section 43 performs processing of a route search from the current location of the vehicle-mounted terminal device 2 to the destination, and transmits route guidance information to the destination, to the vehicle-mounted terminal device 2 through the communication control section 41. The server arithmetic section 43 is also a functional section that transmits information provided on non-guidance to the vehicle-mounted terminal device 2 through the communication control section 41 based on a request of information provided on non-guidance from the user (the vehicle-mounted terminal device 2). Specifically, when the server arithmetic section 43 acquires a request of information provided on non-guidance from the vehicle-mounted terminal device 2, the server arithmetic section 43 outputs information on this request to the normal travel route setting section 44. As described later, the normal travel route setting section 44 sets a normal travel route and stores the normal travel route in the memory device 50. Then, the server arithmetic section 43 reads information on the normal travel route stored in the memory device 50 based on a user ID, and acquires traffic information on a road constituting the normal travel route from the traffic information acquisition section 45. If the acquired traffic information includes information to be notified to the user (e.g., information on traffic congestion or travel regulations), the server arithmetic section 43 generates information provided on non-guidance based on the information. Thereafter, the server arithmetic section 43 transmits the generated information provided on non-guidance to the vehicle-mounted terminal device 2. The server arithmetic section 43 may transmit not only the information provided on non-guidance but also information on the normal travel route itself, that is, information on links constituting the normal travel route, to the vehicle-mounted terminal device 2.

The normal travel route setting section 44 is a functional section that sets a normal travel route. In the present embodiment, the normal travel route setting section 44 performs normal travel route setting processing of setting a reference route satisfying a predetermined first setting condition as the normal travel route. The normal travel route setting section 44 of the present embodiment also performs processing of changing a normal travel route associated with the user ID stored in the memory device 50, depending on a determination result of the normal travel route change determination section 46.

Here, the first setting condition is a condition that is set based on at least the number of times of travel by a user. In the present embodiment, the first setting condition is a condition in which "the number of times in which a user travels along the route is the largest among all the routes traveled by the user in a predetermined time zone (e.g., a commute time zone from 8 am to 9 am in the present embodiment) in a predetermined period (e.g., the most recent one month)." Specific processing of the normal travel route setting section 44 will now be described. When the normal travel route setting section 44 acquires information indicating that a request of information provided on non-guidance is issued from the server arithmetic section 43, the normal travel route setting section 44 extracts travel record data items T obtained in the predetermined period (e.g., the most recent one month) from the travel record data table. Among the extracted travel record data items T, the normal travel route setting section 44 further extracts travel record data items T obtained in a predetermined time zone (e.g., from 8 am to 9 am). Then, the normal travel route setting section 44 sets a route traveled in the largest number of times as a reference route, and sets this reference route as a normal travel route. Thereafter, the normal travel route setting section 44 associates information on links (Link001, Link002, Link012, Link013, and Link024 of a route A in the example of FIG. 2) constituting the reference route set as the normal travel route with a user ID and stores the link information in the memory device 50. The normal travel route setting section 44 may set a normal travel route each time a request of information provided on non-guidance is received from the vehicle-mounted terminal device 2, or set a normal travel route each time a predetermined period has elapsed (e.g., one week or one month).

This configuration will be specifically described with reference to an example shown in FIGS. 2 and 3. As illustrated in FIG. 3, a departure point M represents a location of a home of a user P, a destination N represents a location of an office of the user P, and the route A (including Link001, Link002, Link012, Link013, and Link024) connecting the departure point M and the destination N represents a commute route of the user P. The user P commutes along the route A by a car from 8 am to 9 am every weekday. Thus, as shown in FIG. 2, in travel record data items T on the user P stored in the travel record data table, routes traveled by the user P from 8 am to 9 am in a period from Aug. 5, 2013 to Sep. 5, 2013 are mostly the route A. Then, the normal travel route setting section 44 specifies the route A traveled in the largest number of times by the user P among all the routes traveled by the user P from 8 am to 9 am in the most recent one month, as a reference route satisfying the first setting condition, and sets the route A as a normal travel route.

Based on a determination result from the normal travel route change determination section 46, the normal travel route setting section 44 sets one of the reference route and a temporary route (described later) as a normal travel route. Specifically, in a case where the normal travel route setting section 44 acquires a determination result from the normal travel route change determination section 46 indicating that the normal travel route is changed from the reference route to the temporary route, the normal travel route setting section 44 sets the temporary route as the normal travel route, and changes the normal travel route (information on links constituting the normal travel route) stored in the memory device 50. On the other hand, in a case where the normal travel route setting section 44 acquires a determination result from the normal travel route change determination section 46 indicating that the normal travel route is not changed to the temporary route, the normal travel route setting section 44 maintains a state in which the reference route is set as the normal travel route.

In a case where the normal travel route setting section 44 acquires a determination result from the normal travel route change determination section 46 indicating that after the temporary route is set as the normal travel route, the normal travel route is changed from the temporary route to the reference route, the normal travel route setting section 44 sets the reference route as the normal travel route again and changes the normal travel route stored in the memory device 50. On the other hand, in a case where the normal travel route setting section 44 acquires a determination result from the normal travel route change determination section 46 indicating that the normal travel route is not changed to the reference route, the normal travel route setting section 44 maintains a state in which the temporary route is set as the normal travel route. The memory device 50 stores routes (e.g., the reference route and the temporary route) that were set as the normal travel route in the past.

When receiving a next request of information provided on non-guidance from a user (the vehicle-mounted terminal device 2), the management server 4 (the server arithmetic section 43) transmits information provided on non-guidance on the normal travel route (the temporary route or the reference route) stored in the memory device 50 at this time to the vehicle-mounted terminal device 2 through the communication control section 41. Every time the normal travel route in the memory device 50 is changed, the management server 4 may transmit information provided on non-guidance on the changed normal travel route to the vehicle-mounted terminal device 2 through the communication control section 41.

The traffic information acquisition section 45 is a functional section that acquires traffic information. In the present embodiment, the traffic information acquisition section 45 acquires traffic information from an external road traffic information communication system center, for example. The traffic information acquisition section 45 outputs the acquired traffic information to the server arithmetic section 43 and the temporary travel factor specification section 47.

The normal travel route change determination section 46 is a functional section that determines whether to change the normal travel route to a temporary route that shares a start point and an end point with the reference route and is different from the reference route, in a case where the user travels along the temporary route. In the present embodiment, in a case where the second setting condition is satisfied, the normal travel route change determination section 46 determines that the normal travel route is changed from the reference route to the temporary route. When the second setting condition is not satisfied, the normal travel route change determination section 46 determines that the normal travel route does not need to be changed to the temporary route. Specifically, the normal travel route change determination section 46 monitors the travel record data table of the memory device 50. When the normal travel route change determination section 46 detects that the user travels along a temporary route (a route B in the example of FIG. 2) different from the reference route (the route A in the example of FIG. 2) in a time zone (from 8 am to 9 am in the example of FIG. 2) predetermined in the first setting condition, the normal travel route change determination section 46 outputs the detection result to the temporary travel factor specification section 47. Then, based on a temporary travel factor specified by the temporary travel factor specification section 47, the normal travel route change determination section 46 acquires determination threshold information set by the determination threshold setting section 48 from the memory device 50, determines whether the second setting condition is satisfied by using the determination threshold information, and outputs the determination result to the normal travel route setting section 44.

Here, the second setting condition is a condition that is set based on at least the number of times of travel by a user. In the present embodiment, the second setting condition is a condition in which "the number of times in which a user travels along a temporary route in a predetermined period (e.g., the most recent one week) is greater than or equal to a predetermined determination threshold." The determination threshold is set by the determination threshold setting section 48. The second setting condition may be substantially a condition in which "the number of times in which a user consecutively travels along a temporary route (consecutive number of times of travel) is greater than or equal to a predetermined determination threshold" by setting the predetermined period (e.g., three days) as a period equal to or slightly longer than the determination threshold. For example, in a case where the predetermined period is three days and the determination threshold is three (times), the second setting condition is substantially similar to a condition in which the consecutive number of times of travel is three or more times for a user who travels along the route once a day. The second setting condition may be a condition in which "the consecutive number of time in which a user travels along a temporary route is greater than or equal to a predetermined determination threshold (e.g., three times)." The predetermined period in the second setting condition is preferably shorter than the predetermined period in the first setting condition. In this case, the normal travel route setting section 44 can monitor a travel trend of a user in a relatively long period when setting the reference route as the normal travel route, and thus, can set an appropriate normal travel route. On the other hand, the normal travel route change determination section 46 can monitor a more recent travel trend of a user when determining whether to change the normal travel route to the temporary route, and thus, can appropriately determine whether to change the normal travel route to the temporary route.

The normal travel route change determination section 46 performs processing of, after the normal travel route is changed from the reference route to the temporary route, determining whether or not the normal travel route is changed to the reference route again. In the present embodiment, in a case where the temporary route is set as the normal travel route because the second setting condition is satisfied and then a third setting condition is satisfied, the normal travel route change determination section 46 determines to change the normal travel route from the temporary route to the reference route. In a case where the third setting condition is not satisfied, the normal travel route change determination section 46 determines that the normal travel route does not need to be changed to the reference route. Specifically, the normal travel route change determination section 46 monitors the travel record data table of the memory device 50. When the normal travel route change determination section 46 detects that a user travels along the reference route after the temporary route is set as the normal travel route, the normal travel route change determination section 46 acquires information on the third setting condition from the memory device 50. Then, the normal travel route change determination section 46 determines whether or not the third setting condition is satisfied, and outputs the determination result to the normal travel route setting section 44.

The third setting condition is herein a predetermined condition. In the present embodiment, the third setting condition is set in a manner similar to the second setting condition, and is specifically a condition in which "the number of times in which a user travels along a reference route in a predetermined period (e.g., the most recent one week) after the temporary route is set as the normal travel route is greater than or equal to a predetermined determination threshold." Here, the determination threshold in the third setting condition is preferably set to be equal to or lower than the determination threshold in the second setting condition. In a case where the determination threshold in the third setting condition is set to be lower than the determination threshold in the second setting condition, the normal travel route can be changed from the temporary route to the reference route earlier than the case where the normal travel route is changed from the reference route to the temporary route, which is likely to match the sense of the user.

As described above, in the present embodiment, the normal travel route change determination section 46 and the normal travel route setting section 44 perform temporary change processing of temporarily changing the normal travel route from the reference route to the temporary route based on the second setting condition and temporary change cancellation processing of changing the normal travel route from the temporary route to the reference route based on the third setting condition.

The temporary travel factor specification section 47 is a functional section that performs factor specification processing of, in a case where the user travels along a temporary route, specifying a temporary travel factor that is a factor in which the user travels along the temporary route. In the present embodiment, in the factor specification processing, the temporary travel factor specification section 47 acquires traffic information on a portion of the reference route not shared by the temporary route (Link002, Link012, and Link013 on the route A in the example of FIG. 3), and specifies a temporary travel factor based on the traffic information. Specifically, when the temporary travel factor specification section 47 acquires information from the normal travel route change determination section 46 indicating that the user has traveled along the temporary route, the temporary travel factor specification section 47 acquires traffic information on the portion of the reference route not shared by the temporary route from the traffic information acquisition section 45. Then, if the traffic information includes information on a travel regulation, the temporary travel factor specification section 47 specifies the travel regulation as the temporary travel factor. Thereafter, the temporary travel factor specification section 47 outputs the specified result (indicating that the temporary travel factor is the travel regulation) to the determination threshold setting section 48. The temporary travel factor specification section 47 may store the specified result in the memory device 50. Here, the travel regulation (traffic regulation) refers to road closure or partial lane closure, and restriction on the travel speed or vehicle height in case of traffic accident or disaster. Specifically, examples of the travel regulation include travel regulations on unusual weather (e.g., snow and freeze regulations, a storm wave regulation, a wind regulation, and a visibility regulation), a construction regulation related to road construction, and a regulation related to an event.

Examples of the travel regulation also include a travel regulation in which the period is defined, which is related to road construction or an event, and a travel regulation in which the period is not defined, such as travel regulations under unusual weather, and that is canceled when the unusual weather (e.g., heavy rain, snow, freeze, or dense fog) is canceled. In view of this, in a case where the traffic information includes information on a travel regulation and a travel regulation period in which the travel regulation continues is preset, the temporary travel factor specification section 47 also acquires information on the travel regulation period, and specifies the travel regulation in the travel regulation period as a temporary travel factor. Specifically, in a case where the travel regulation period is predetermined, such as the case of road construction, the temporary travel factor specification section 47 also acquires information on the travel regulation period through the traffic information acquisition section 45, specifies the travel regulation in the acquired travel regulation period as a temporary travel factor, and outputs the specified result (indicating that the temporary travel factor is the travel regulation in the travel regulation period) and information on the travel regulation period to the determination threshold setting section 48. The temporary travel factor specification section 47 may also store the specified result and information on the travel regulation period in the memory device 50.

On the other hand, in a case where traffic information on a portion of the reference route not shared by the temporary route does not include information on the travel regulation and includes information (e.g., traffic congestion information) on traffic disturbance other than the travel regulation, the temporary travel factor specification section 47 specifies the traffic disturbance as a temporary travel factor, and outputs the specified result to the determination threshold setting section 48. In a case where the traffic information on the portion of the reference route not shared by the temporary route includes both information on the travel regulation and information on traffic disturbance other than the travel regulation, the temporary travel factor specification section 47 preferably specifies the travel regulation with priority as a temporary travel factor. For example, in a case where the portion of the reference route not shared by the temporary route is a road with two lanes in each direction, and the traffic information on the portion of the reference route not shared by the temporary route includes both information on a single-lane restriction and traffic congestion information, the traffic congestion is assumed to occur because of the single-lane restriction, and thus, the temporary travel factor specification section 47 specifies the travel regulation (single-lane restriction) as a temporary travel factor.

The determination threshold setting section 48 is a functional section that performs condition setting processing of setting a second setting condition that varies depending on the content of the temporary travel factor specified by the factor specification processing of the temporary travel factor specification section 47. The determination threshold setting section 48 also performs condition setting processing of setting a third setting condition that varies depending on the content of the temporary travel factor specified by the factor specification processing of the temporary travel factor specification section 47, after a temporary route is set as a normal travel route. In the present embodiment, the determination threshold setting section 48 sets determination thresholds for the second setting condition and the third setting condition in such a manner that the determination thresholds vary depending on the content of the temporary travel factor specified by the temporary travel factor specification section 47. Then, the determination threshold setting section 48 stores information on the set determination threshold in the memory device 50.

Specifically, the determination threshold setting section 48 sets a determination threshold in a case where the temporary travel factor is the travel regulation at a value smaller than a determination threshold in a case where the temporary travel factor is traffic disturbance (e.g., traffic congestion) other than the travel regulation. In the present embodiment, the second setting condition is a condition in which “the number of times in which a user travels along a temporary route in a predetermined period (e.g., the most recent one week) is greater than or equal to a predetermined determination threshold.” Thus, in the determination threshold setting section 48, the determination threshold in a case where the temporary travel factor is traffic disturbance other than the travel regulation is set to be relatively high (e.g., four times), and the determination threshold in a case where the temporary travel factor is the travel regulation is set to be lower (e.g., twice) than the determination threshold in a case where the temporary travel factor is traffic disturbance.

In the determination threshold setting section 48, the determination threshold is set at a value that decrease continuously or stepwise as the travel regulation period increases. Specifically, when the determination threshold setting section 48 acquires information from the temporary travel factor specification section 47 indicating that a temporary travel factor is the travel regulation in which the period is defined and information on the travel regulation period, if the travel regulation period is relatively long (e.g., one month because of road construction or other factors), the determination threshold setting section 48 sets the determination threshold for the second setting condition at a small value (e.g., once), and sets the determination threshold in a case where the travel regulation period is relatively short (e.g., two days because of an event such as a festival, for example) at a value larger (e.g., twice) than the determination threshold in a case where the travel regulation period is relatively long.

Figure 4:
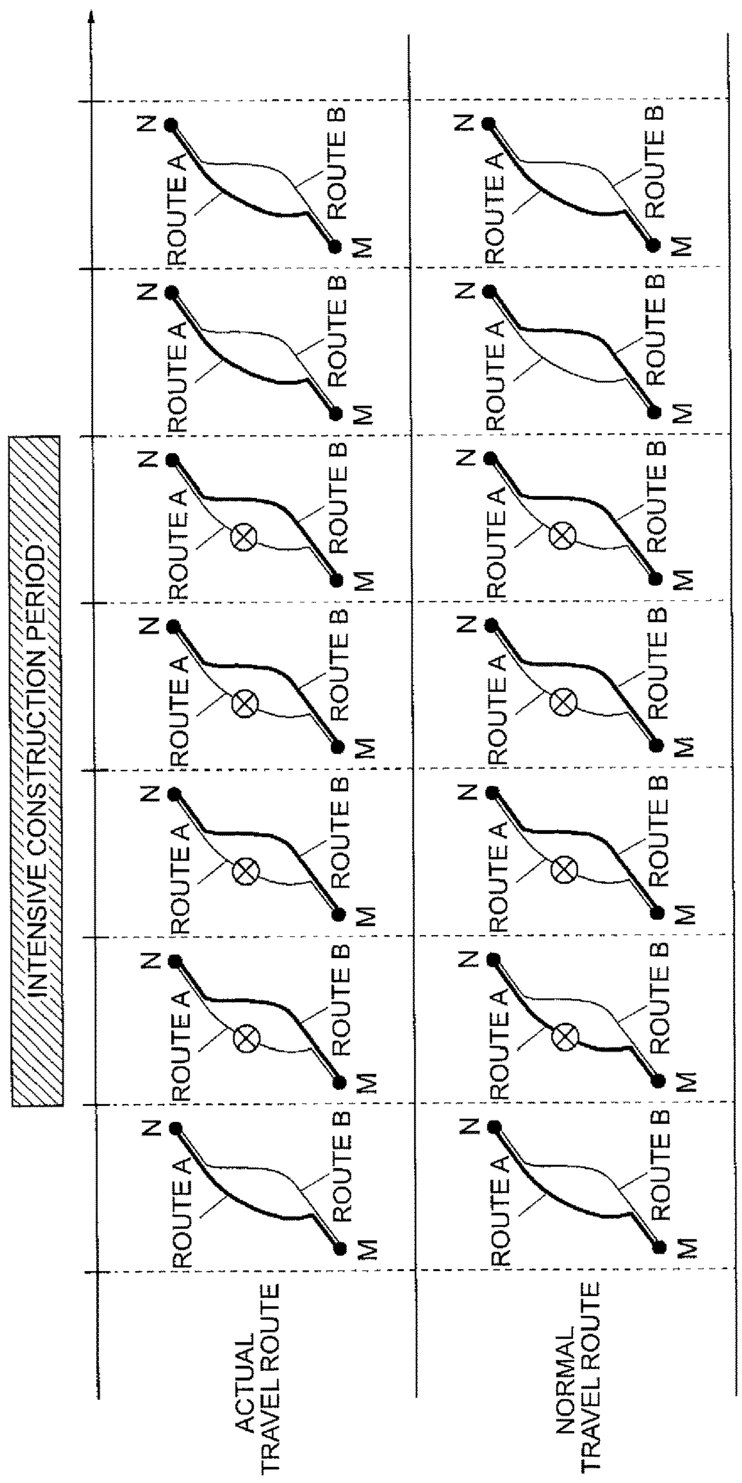
FIG. 4 shows comparison between a normal travel route and an actual travel route.

Referring to FIG. 4, specific examples in which the temporary route is set as the normal travel route and in which the reference route is set as the normal travel route again after the temporary route is set as the normal travel route will be described. In the examples of FIG. 4, the temporary travel factor is road closure related to intensive construction, and a travel regulation period is four days. The second setting condition is set as a condition in which “the number of times in which a user travels along the temporary route in a predetermined period (the most recent two days) is greater than or equal to a predetermined determination threshold (once).” In a manner similar to the second setting condition, the third setting condition is set as a condition in which “the number of times in which a user travels along the reference route in a predetermined period (the most recent two days) is greater than or equal to a predetermined determination threshold (once).” In FIG. 4, columns are separated for each day with time represented by the horizontal axis. The upper parts of the columns represent routes actually traveled by the user, whereas the lower parts of the columns represent normal travel routes that are set. Before the start of an intensive construction period, the route A, which is the reference route, is set as the normal travel route.

As described above, before an intensive construction period starts, the normal travel route is the route A. Since the intensive construction period is not started, traveling along the route A is permitted, and the user travels along the route A (see the left column in FIG. 4). When the intensive construction period starts, the route A is closed, and thus, the user travels along the route B as shown in the upper part of the second column from the left in FIG. 4. At this time, the normal travel route is still the route A (the lower part of the second column from the left in FIG. 4). Then, when it is found that the user travels along the route B, the second setting condition in which the number of times of travel along the temporary route (route B) within the most recent two days is greater than or equal to a predetermined determination threshold (once) is satisfied. Thus, the normal travel route change determination section 46 determines that the normal travel route needs to be changed from the route A, which is the reference route, to the route B, which is the temporary route, and the normal travel route setting section 44 sets the route B as the normal travel route. Accordingly, as shown in the lower part of the third column from the left in FIG. 4, the normal travel route is changed to the route B on the next day.

In addition, after the intensive construction period is ended, traveling along the route A is permitted and the user travels along the route A. At this time, the normal travel route is still the route B (see the second column from the right in FIG. 4). Then, when it is found that the user travels along the route A, the third setting condition in which the number of times of travel along the reference route (route A) within the most recent two days is greater than or equal to a predetermined determination threshold (once) is satisfied. Thus, the normal travel route change determination section 46 determines that the normal travel route needs to be changed from the route B, which is the temporary route, to the route A, which is the reference route, and the normal travel route setting section 44 sets the route A as the normal travel route. Consequently, as shown in the lower part of the right column in FIG. 4, the normal travel route is changed to the route A on the next day.

4. Operational Processing Procedures

Figure 5:
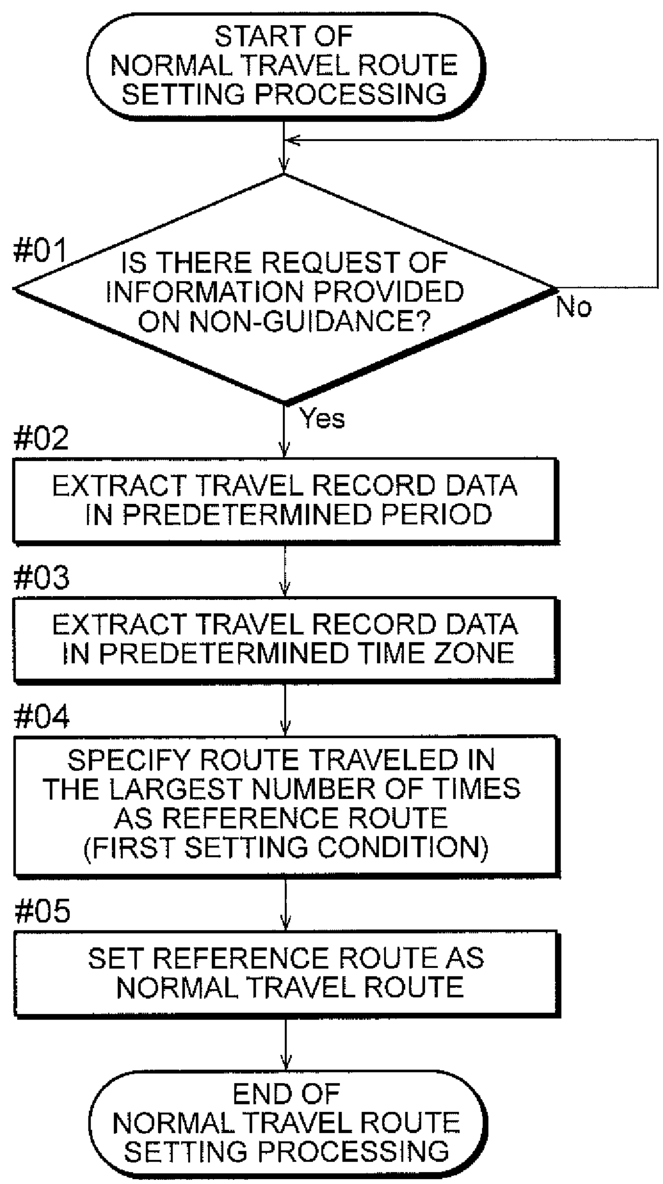
FIG. 5 is a flowchart showing a procedure for processing of setting a normal travel route.
Figure 6:
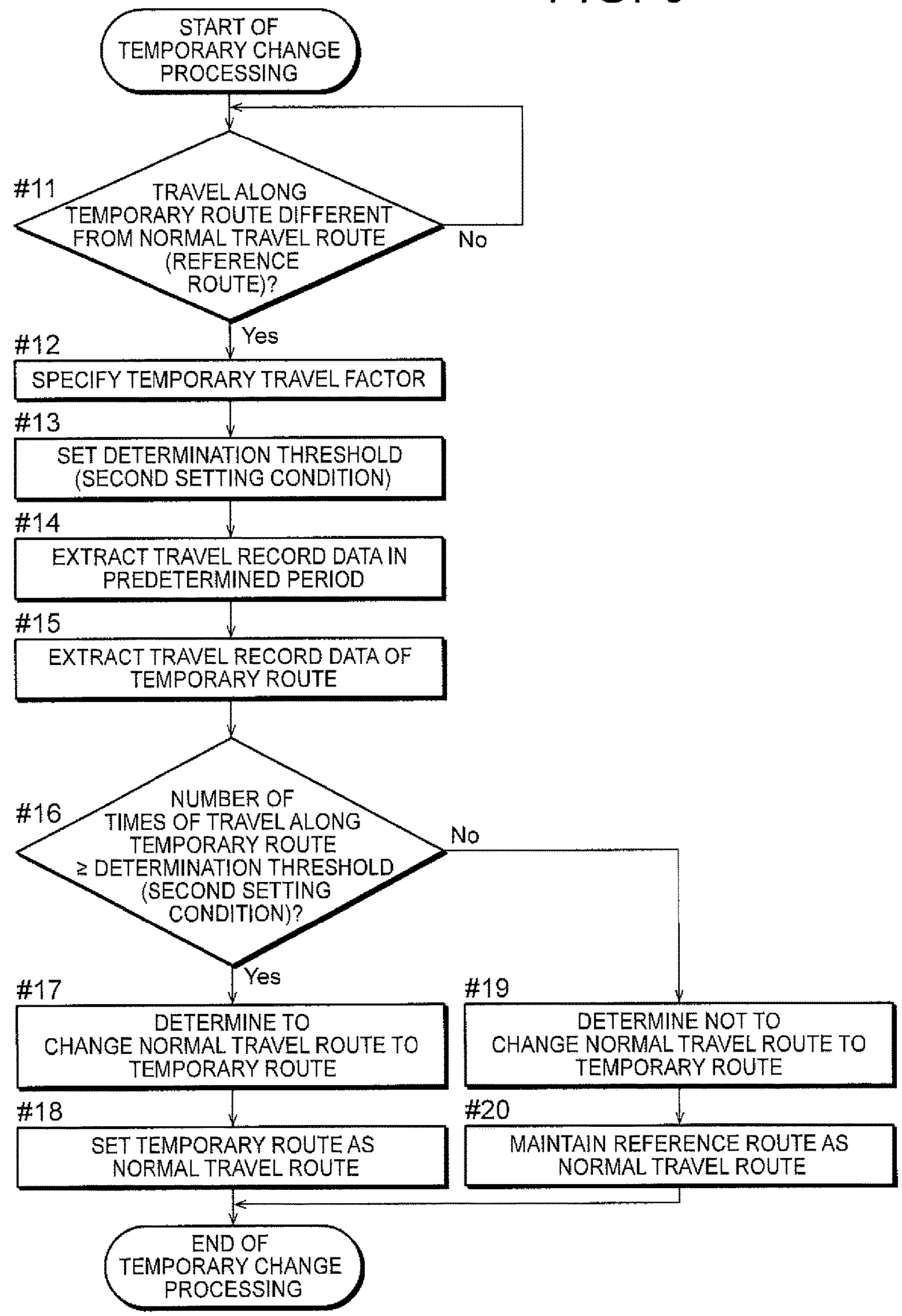
FIG. 6 is a flowchart showing a procedure for temporary change processing.

Then, operational procedures for setting processing, temporary change processing, and temporary change cancellation processing for a normal travel route according to the present embodiment will be described with reference to FIGS. 5 to 7. First, referring to FIG. 5, a procedure for processing of setting the reference route as the normal travel route will be described. In this example, the first setting condition is a condition in which “the number of times in which a user travels along the route is the largest among all the routes traveled by the user in a predetermined time zone (e.g., a commute time zone from 8 am to 9 am) in a predetermined period (e.g., the most recent one month).” When the normal travel route setting section 44 acquires a request of information provided on non-guidance from the vehicle-mounted terminal device 2 (step #01: Yes), the normal travel route setting section 44 extracts travel record data items T obtained in a predetermined period (e.g., the most recent one month) from the travel record data table among the travel record data items T on the user who received the request of information provided on non-guidance, based on the first setting condition (step #02). Next, the normal travel route setting section 44 further extracts travel record data items T obtained in a predetermined time zone (e.g., 8 am to 9 am) from the travel record data items T extracted in step #02 (step #03). Then, the normal travel route setting section 44 specifies a route traveled in the largest number of times by the user among the travel record data items T extracted in step #03, as a reference route (step #04). The normal travel route setting section 44 sets the specified reference route as a normal travel route (step #05), and ends the processing of setting the normal travel route. If the normal travel route setting section 44 does not acquire a request of information provided on non-guidance from the vehicle-mounted terminal device 2, the normal travel route setting section 44 waits for a request of information provided on non-guidance (step #01: No).

Then, a procedure for temporary change processing of setting the temporary route as the normal travel route will be described with reference to FIG. 6. In this example, the second setting condition is a condition in which "the number of times in which a user travels along a temporary route in a predetermined period (e.g., the most recent one week) is greater than or equal to a predetermined determination threshold." As shown in FIG. 6, if the normal travel route change determination section 46 detects that a user travels a temporary route different from the reference route (step #11: Yes), the temporary travel factor specification section 47 specifies a temporary travel factor that is a factor in which the user travels along the temporary route (step #12). If the normal travel route change determination section 46 does not detect that the user travels along the temporary route (step #11: No), the normal travel route change determination section 46 continues to monitor the travel record data table to determine whether the user travels along the temporary route. Thereafter, the determination threshold setting section 48 sets a determination threshold for the second setting condition depending on the temporary travel factor specified in step #12 (step #13), and stores the determination threshold in the memory device 50. Based on the second setting condition, the normal travel route change determination section 46 extracts travel record data items T obtained in a predetermined period (e.g., the most recent one week) from the travel record data table (step #14). In addition, the normal travel route change determination section 46 extracts travel record data items T in which the user travels along the temporary route from the travel record data items T extracted in step #14 (step #15). Then, the normal travel route change determination section 46 acquires information on the determination threshold set in step #13 from the memory device 50, and calculates the number of times of travel along the temporary route from the travel record data items T extracted in step #15. The normal travel route change determination section 46 compares the determination threshold with the number of times of travel along the temporary route. If the obtained number of times of travel along the temporary route is greater than or equal to the determination threshold (step #16: Yes), the normal travel route change determination section 46 determines to change the normal travel route to the temporary route (step #17). Then, the normal travel route setting section 44 sets the temporary route as the normal travel route, stores the set temporary route in the memory device 50 (step #18), and ends the temporary change processing. On the other hand, in step #16, if the number of times of travel along the temporary route is less than the determination threshold (step #16: No), the normal travel route change determination section 46 determines not to change the normal travel route to the temporary route (step #19), maintains the reference route as the normal travel route (step #20), and ends the temporary change processing.

Then, a procedure for the temporary change cancellation processing of setting the reference route as the normal travel route again after the temporary route is set as the normal travel route in step #18 in FIG. 6 will be described with reference to FIG. 7. In this example, the third setting condition is a condition in which "the number of times in which a user travels along the reference route in a predetermined period (e.g., the most recent one week) is greater than or equal to a predetermined determination threshold," As shown in FIG. 7, after the temporary route is set as the normal travel route (step #21: Yes), if the normal travel route change determination section 46 detects that a user travels along the reference route (step #22: Yes), the normal travel route change determination section 46 acquires information on the determination threshold for the third setting condition stored in the memory device 50 (step #23). If the normal travel route change determination section 46 does not detect that the user travels along the reference route (step #22: No), the normal travel route change determination section 46 continues to monitor the travel record data table to detect whether the user travels along the reference route. Then, based on the third setting condition, the normal travel route change determination section 46 extracts travel record data items T obtained in a predetermined period (e.g., the most recent one week) from the travel record data table (step #24). The normal travel route change determination section 46 further extracts travel record data items T in which the user travels along the reference route from the travel record data items T extracted in step #24 (step #25). Thereafter, the normal travel route change determination section 46 calculates the number of times of travel along the reference route from the travel record data items T extracted in step #25. The normal travel route change determination section 46 compares the information on the determination threshold acquired in step #23 with the number of times of travel along the reference route. If the number of times of travel along the reference route is greater than or equal to the determination threshold (step #26: Yes), the normal travel route change determination section 46 determines to change the normal travel route to the reference route (step #27). Then, the normal travel route setting section 44 sets the reference route as the normal travel route again, stores the set reference route in the memory device 50 (step #28), and ends the temporary change cancellation processing. On the other hand, in step #26, if the number of times of travel along the reference route is less than the determination threshold (step #26: No), the normal travel route change determination section 46 determines not to change the normal travel route to the reference route (step #29), maintains the temporary route as the normal travel route (step #30), and ends the temporary change cancellation processing. In step #21, if the temporary route is not set as the normal travel route (step #21: No), the temporary change cancellation processing is ended.

5. Overview of the Embodiment

The navigation system 1 according to the embodiment described above includes at least the following configuration. Specifically, the navigation system 1 includes a computation processing portion configured to perform: information provision processing of providing information on a set normal travel route by using an information output device in a case where a guidance route for providing guidance to a user is not set; normal travel route setting processing of setting a reference route satisfying a predetermined first setting condition as the normal travel route; factor specification processing of, in a case where the user travels along a temporary route that shares a start point and an end point with the reference route and is different from the reference route, specifying a temporary travel factor that is a factor in which the user travels along the temporary route; condition setting processing of setting a second setting condition that varies depending on a content of the temporary travel factor specified by the factor specification processing; and temporary change processing of changing the normal travel route from the reference route to the temporary route, based on the second setting condition set by the condition setting processing.

With this configuration, in a case where the user travels along the temporary route different from the reference route, an appropriate second setting condition can be set depending on the content of a temporary travel factor that is a factor in which the user travels along the temporary route. Thus, by performing the temporary change processing of setting the temporary route as the normal travel route based on the second setting condition set depending on the content of the temporary travel factor, a normal travel route that reflects the user's intension can be set. In addition, by providing information on the normal travel route thus set, information useful for the user can be provided even in a case where no guidance route is set.

The computation processing portion is preferably configured to further perform: the condition setting processing of setting a third setting condition that varies depending on a content of the temporary travel factor specified by the factor specification processing, after the temporary route is set as the normal travel route; and temporary change cancellation processing of changing the normal travel route from the temporary route to the reference route, based on the third setting condition set by the condition setting processing.

With this configuration, an appropriate third setting condition can be set depending on the content of the temporary travel factor, so that the reference route can be returned to the normal travel route at an appropriate timing after the temporary route is set as the normal travel route. Consequently, information on the normal travel route can be appropriately provided to the user.

Preferably, in the second setting condition, the number of times in which the user travels along the temporary route in a predetermined period is greater than or equal to a predetermined determination threshold, and in the condition setting processing, the determination threshold varies depending on the content of the temporary travel factor.

With this configuration, since the second setting condition is set based on the number of times in which the user travels along the temporary route, it can be relatively easily determined whether the second setting condition is satisfied or not. In addition, since the determination threshold varies depending on the content of the temporary travel factor, the normal travel route can be appropriately set to one of the reference route and the temporary route. Consequently, information on the normal travel route can be appropriately provided to the user.

In the factor specification processing, traffic information on a portion of the reference route not shared by the temporary route is acquired, and in a case where the traffic information includes information on a travel regulation, the travel regulation is specified as the temporary travel factor, and in the condition setting processing, the determination threshold in a case where the temporary travel factor is the travel regulation is preferably set to be lower than the determination threshold in a case where the temporary travel factor is other than the travel regulation.

In a case where the temporary travel factor is the travel regulation, the user is highly likely to travel along the temporary route because the reference route cannot be traveled or difficult to be traveled. On the other hand, in a case where the temporary travel factor is traffic disturbance (e.g., traffic congestion) other than the travel regulation, traveling along the reference route is permitted, but the user is highly likely to travel along the temporary route based on the user's determination for shortening the required time, for example. Thus, in the case where the temporary travel factor is the travel regulation, especially when the travel regulation continues for a long period, for example, the user will continuously travel along the temporary route, and it is preferable to set the temporary route as the normal travel route at an early timing. On the other hand, in a case where the temporary travel factor is traffic disturbance such as traffic congestion other than the travel regulation, the user travels along various routes such as the reference route or the temporary route depending on the user's determination. Thus, it is not preferable to promptly set the temporary route as the normal travel route. With this configuration, the determination threshold in a case where the temporary travel factor is the travel regulation can be lower than the determination threshold in a case where the temporary travel factor is traffic disturbance other than the travel regulation. Thus, in the case where the temporary travel factor is the travel regulation, the temporary route is set as the normal travel route at a relatively early timing. In a case where the temporary travel factor is traffic disturbance other than the travel regulation, the number of times of travel along the temporary route before the temporary route is set as the normal travel route can be increased. Thus, since one of the reference route and the temporary route can be appropriately set as the normal travel route depending on the situations, information on the normal travel route can be appropriately provided to the user.

In the factor specification processing, in a case where the traffic information includes information on a travel regulation, information on a travel regulation period in which the travel regulation continues is also acquired, and the temporary travel factor is specified as the travel regulation in the travel regulation period, and in the condition setting processing, the determination threshold is preferably set at a value that decreases continuously or stepwise as the travel regulation period increases.

In general, in a case where a travel regulation in which the period is predetermined is established, the user travels along the temporary route for the entire travel regulation period. If the travel regulation period is long, the period in which the user travels along the temporary route increases accordingly. Thus, in such a case, information on the temporary route is preferably promptly provided to the user. On the other hand, if the travel regulation period is short (e.g., one day), for example, the period in which the user travels along the temporary route is short, and the user is likely to travel along the reference route after the travel regulation period is ended. Thus, it may not be preferable to promptly provide information on the temporary route to the user, instead of information on the reference route. With the configuration described above, the determination threshold can be set at a value that decreases continuously or stepwise as the travel regulation period increases. Thus, in a case where the travel regulation period is long, the temporary route is set as the normal travel route at a relatively early timing. In a case where the travel regulation period is short, the number of times of travel along the temporary route before the temporary route is set as the normal travel route can be increased. Consequently, one of the reference route and the temporary route can be appropriately set as the normal travel route depending on the situations, and thus, information on the normal travel route can be appropriately provided to the user.

6. Other Embodiments

Lastly, other embodiments will be described. The constitution of each embodiment described herein is not limited to be applied in an individual manner, and may be applied in combination with the constitution of other embodiments unless an inconsistency occurs.

(1) In the embodiment described above, the navigation system 1 includes the vehicle-mounted terminal devices 2 each mounted on a vehicle and the management server 4. However, embodiments are not limited to this example. The navigation system 1 may be constituted by the management server 4 and a terminal device that can communicate with the management server 4 and may be carried by a user, and may be constituted by the management server 4 and a device such as a multifunctional cellular phone or a portable information terminal device.

(2) In the embodiment described above, in a case where no guidance route is set although the location information detection device 31, for example, detects that a vehicle starts traveling, the on-vehicle arithmetic section 22 transmits a request of information provided on non-guidance, which is associated with a user ID, to the management server 4. However, embodiments are not limited to this example. For example, in a case where an ignition key is ON state and no guidance route is set, the on-vehicle arithmetic section 22 may transmit a request of information provided on non-guidance to the management server 4 at a predetermined timing (e.g., when 30 seconds have passed after the ignition key was turned ON).

(3) In the embodiment described above, the travel record data generation section 23 generates a travel record data item T by associating information on a link traveled by a user with information on a time when the user entered the link. However, embodiments are not limited to this example. For example, a travel record data item T may be generated with information on a link traveled by the user being associated with information on a time when the user exited from the link, or with information on a link traveled by the user being associated with information on both a time when the user entered the link and a time when the user exited from the link. In the travel record data generation section 23, a record of roads traveled by a vehicle can be set in predetermined road units constituted by a plurality of links, instead of units of links, and a travel record data item T may be generated with the information on these road units being associated with information on a time when the vehicle entered a link at the end among the links constituting the road units.

(4) In the embodiment described above, the first setting condition is a condition in which "the number of times in which the user travels along the route is the largest among all the routes traveled by the user in a predetermined time zone in a predetermined period." However, embodiments are not limited to this example. For example, the first setting condition may be a condition in which "the most recent consecutive number of times of travel in a predetermined time zone (e.g., 8 am to 9 am) is greater than or equal to a predetermined number (e.g., five times)."

(5) In the embodiment described above, one normal travel route is set in each time zone. However, embodiments are not limited to this example. If the user travels along the same route in opposite directions in a time zone of start of office hours (from 8 am to 9 am) and a time zone for returning home (e.g., 6 pm to 7 pm), a predetermined time zone for the first setting condition may be set as these two time zones, and a reference route is determined by adding travel record data items T of these two time zones to set a normal travel route.

(6) In the embodiment described above, the third setting condition is a condition in which "the number of times in which a user travels along a reference route in a predetermined period (e.g., the most recent one week) after the temporary route is set as the normal travel route is greater than or equal to a predetermined determination threshold." However, embodiments are not limited to this example, and the third setting condition may not be set based on the number of times of travel by a user. For example, the third setting condition may be set based on a time that has elapsed after a temporary travel factor is canceled. Specifically, the third setting condition may be a condition in which "if the temporary travel factor is canceled after the temporary route is set as the normal travel route, a time (e.g., the number of days) that has elapsed from the time when the temporary travel factor is canceled is greater than or equal to a predetermined determination threshold." For example, in a case where a road is closed for a long period because of the temporary travel factor that is construction, for example, the normal travel route is preferably returned to an original reference route at an early timing. Thus, the determination threshold is set to 0 (zero) days or longer (immediately after detecting that the temporary travel factor is canceled), for example. If the temporary travel factor is traffic congestion, for example, the determination threshold can be four days or more, for example.

(7) In the embodiment described above, in a case where the temporary travel factor specification section 47 specifies a predetermined travel regulation as the temporary travel factor, the determination threshold setting section 48 sets the determination threshold at a value that decreases continuously or stepwise as the travel regulation period increases. However, embodiments are not limited to this example. For example, in a case where the temporary travel factor specification section 47 specifies the travel regulation as the temporary travel factor, the determination threshold setting section 48 may set the determination threshold in accordance with the degree of the travel regulation. Specifically, in a case where the temporary travel factor specification section 47 specifies the travel regulation as the temporary travel factor, and the travel regulation is road closure and travel is completely inhibited, the determination threshold setting section 48 sets the determination threshold at a smaller value. On the other hand, in a case where the number of lanes is reduced but travel is permitted, as in a case where the travel regulation is single-lane restriction, for example, the determination threshold can be set higher than that in a case where travel is completely inhibited because of road closure.

(8) In the embodiment described above, the management server 4 includes the normal travel route setting section 44, the normal travel route change determination section 46, the temporary travel factor specification section 47, the determination threshold setting section 48, and the travel record data table. However, embodiments are not limited to this example. These components may be included in each of the vehicle-mounted terminal devices 2. In the embodiment described above, the server arithmetic section 43 performs the route search processing of each of the vehicle-mounted terminal devices 2, for example. Alternatively, the on-vehicle arithmetic section 22 of each of the vehicle-mounted terminal devices 2 may perform the route search processing, for example.

(9) In the embodiment described above, the navigation system 1 is constituted by the management server 4 and the vehicle-mounted terminal device 2. However, embodiments are not limited to this example. For example, each of the vehicle-mounted terminal devices 2 may include the functional sections (the server arithmetic section 43, the normal travel route setting section 44, the traffic information acquisition section 45, the normal travel route change determination section 46, the temporary travel factor specification section 47, and the determination threshold setting section 48) of the management server 4, and the navigation system 1 may be constituted only by the vehicle-mounted terminal devices 2.

The invention claimed is:

1. A navigation system comprising:

a memory storing a computer-executable navigation program; and a processor that, when executing the stored program:

sets a reference route satisfying a predetermined first setting condition as a normal travel route;

outputs on an output device information on the set normal travel route when a guidance route for providing guidance to a user is not set;

when the user has traveled along a temporary route that shares a start point and an end point with the reference route and is different from the reference route, specifies a temporary travel factor that is a factor in which the user traveled along the temporary route;

sets a second setting condition that varies depending on a content of the specified temporary travel factor; and changes the normal travel route from the reference route to the temporary route, based on the second setting condition.

2. The navigation system according to claim 1, wherein the processor, when executing the stored program:

sets a third setting condition that varies depending on a content of the specified temporary travel factor, after the temporary route is set as the normal travel route; and changes the normal travel route from the temporary route to the reference route, based on the third setting condition.

3. The navigation system according to claim 2, wherein the second setting condition is that a number of times in which the user travels along the temporary route in a predetermined period is greater than or equal to a predetermined determination threshold that varies depending on a content of the temporary travel factor.

4. The navigation system according to claim 3, wherein the processor, when executing the stored program:

acquires traffic information on a portion of the reference route not shared by the temporary route;

when the traffic information includes information on a travel regulation, the travel regulation is specified as the temporary travel factor, and when the temporary travel factor is the travel regulation, the determination threshold is set to be lower than a value of the determination threshold when the temporary travel factor is not the travel regulation.

5. The navigation system according to claim 4, wherein the processor, when executing the stored program:

when the traffic information includes information on the travel regulation:

also acquires information on a travel regulation period in which the travel regulation continues; and specifies the temporary travel factor as the travel regulation in the travel regulation period; and sets the determination threshold at a value that decreases either continuously or stepwise as the travel regulation period increases.

6. The navigation system according to claim 1, wherein the second setting condition is that a number of times in which the user travels along the temporary route in a predetermined period is greater than or equal to a predetermined determination threshold that varies depending on a content of the temporary travel factor.

7. The navigation system according to claim 6, wherein the processor, when executing the stored program:

acquires traffic information on a portion of the reference route not shared by the temporary route;

when the traffic information includes information on a travel regulation, the travel regulation is specified as the temporary travel factor, and when the temporary travel factor is the travel regulation, the determination threshold is set to be lower than a value of the determination threshold when the temporary travel factor is not the travel regulation.

8. The navigation system according to claim 7, wherein the processor, when executing the stored program:

when the traffic information includes information on the travel regulation:

also acquires information on a travel regulation period in which the travel regulation continues; and specifies the temporary travel factor as the travel regulation in the travel regulation period; and sets the determination threshold at a value that decreases either continuously or stepwise as the travel regulation period increases.

9. A navigation method comprising:

setting a reference route satisfying a predetermined first setting condition as a normal travel route;

outputting on an output device information on the set normal travel route when a guidance route for providing guidance to a user is not set;

when the user has traveled along a temporary route that shares a start point and an end point with the reference route and is different from the reference route, specifying a temporary travel factor that is a factor in which the user traveled along the temporary route;

setting a second setting condition that varies depending on a content of the specified temporary travel factor; and changing the normal travel route from the reference route to the temporary route, based on the second setting condition.

10. A computer-readable storage medium storing a computer-executable navigation program comprising instructions that causing a computer to perform the following functions:

setting a reference route satisfying a predetermined first setting condition as a normal travel route;

outputting on an output device information on the set normal travel route when a guidance route for providing guidance to a user is not set;

when the user has traveled along a temporary route that shares a start point and an end point with the reference route and is different from the reference route, specifying a temporary travel factor that is a factor in which the user traveled along the temporary route;

setting a second setting condition that varies depending on a content of the specified temporary travel factor; and changing the normal travel route from the reference route to the temporary route, based on the second setting condition.

* * * * *